United States Patent [19]
Wang et al.

[11] Patent Number: 5,914,879
[45] Date of Patent: Jun. 22, 1999

[54] SYSTEM AND METHOD FOR CALCULATING CLUSTER TOOL PERFORMANCE METRICS USING A WEIGHTED CONFIGURATION MATRIX

[75] Inventors: Qingsu Wang, Austin; Craig William Christian, Buda; John B. Crowley; Denver L. Dolman, both of Austin, all of Tex.

[73] Assignee: Advanced Micro Devices

[21] Appl. No.: 08/886,824

[22] Filed: Mar. 4, 1997

[51] Int. Cl.⁶ .................................................. G06F 19/00
[52] U.S. Cl. ...................................... 364/468.18; 702/182
[58] Field of Search ........... 364/468.01, 468.15–468.16, 364/468.18, 468.19; 702/182–185

[56] References Cited

U.S. PATENT DOCUMENTS

| | | | |
|---|---|---|---|
| 5,241,465 | 8/1993 | Oba et al. ..................................... | 705/8 |
| 5,408,405 | 4/1995 | Mozumder et al. ...................... | 364/151 |
| 5,444,632 | 8/1995 | Kline et al. ......................... | 364/468.06 |
| 5,659,593 | 8/1997 | Tzvieli . | |
| 5,719,796 | 2/1998 | Chen . | |
| 5,740,429 | 4/1998 | Wang et al. ............................. | 395/180 |
| 5,801,945 | 9/1998 | Comer ................................. | 364/468.01 |

OTHER PUBLICATIONS

Auches et al., Managing Multi–chamber Tool Productivity, IEEE/Semi Advanced Semiconductor Manufacturing Conference pp. 240–247, Dec. 1995.

Dhudshra et al., Claster Tool Performance Tracking, Future FAB International pp. 173–175, no date but considered.

Not attributed, SEMI E10–96 Standard for Definition & Measurement of Equipment Reliability, Availability, and Maintainability (RAM), Nov. 28, 1995.

Not attributed, SEMI E10–92 Guideline for Definition and Measurement of Equipment Reliability, Availabitiy, and Maintainabililty (RAM) pp. 67–75, no date but considered.

Unattributed, Process and Hardware Overview, Novellus Systems Inc., no date but considered.

Nakajima, *Introduction to Productive Maintenance*, Productivity Press, Portland, Oregon, 1988, pp. 12–15 and 21–52.

*Primary Examiner*—John Barlow
*Assistant Examiner*—Craig Steven Miller
*Attorney, Agent, or Firm*—Kevin L. Daffer; Robert C. Kowert; Conley, Rose & Tayon

[57] ABSTRACT

A system and method for calculating the performance of a cluster tool using a weighted configuration matrix. The system includes a computer system which maintains a database of entities corresponding to semiconductor wafer processing modules in a fab. A user "clusters" the entities, i.e., selects entities to reflect the relationship of the constituent modules physically linked together which form the cluster tool. The user also designates a main module against which the main performance events of the cluster tool, such as begin run and end run, are logged in the database. The computer system configures all of the "up" and "down" state configuration combinations of the cluster tool modules and displays the configurations for the user. The user specifies a weight for each of the configurations based upon an estimate of the performance the cluster tool while in the respective configuration relative to the performance of the cluster tool in a fully operable configuration. For example, the user may choose the weights based upon the throughput of wafers capable of being processed by the cluster tool in each of the respective configurations, the number of wafer processes capable of being performed by the cluster tool in each of the respective configurations, or the economic value added (EVA) by the wafer processes capable of being performed by the cluster tool in each of the respective configurations. The computer system compiles the configurations and received weights into a weighted configuration matrix which is used to calculate the performance of the cluster tool. In particular, the E10 metrics and OEE metric components are calculated as a measure of the reliability, availability, maintainability, operational efficiency and utilization aspects of performance of the cluster tool over a total period of time. Formulas for calculating various of the metrics using the configuration matrix are provided. The method is applicable to both sequential and parallel type cluster tools and does not require additional data tracking beyond currently tracked data.

32 Claims, 5 Drawing Sheets

Weighted Configuration Matrix

| Configuration | loadlock chamber A | loadlock chamber B | process chamber A | process chamber B | Weight |
|---|---|---|---|---|---|
| 1 | 0 | 0 | 0 | 0 | 0 |
| 2 | 0 | 0 | 0 | 1 | 0 |
| 3 | 0 | 0 | 1 | 0 | 0 |
| 4 | 0 | 0 | 1 | 1 | 0 |
| 5 | 0 | 1 | 0 | 0 | 0 |
| 6 | 0 | 1 | 0 | 1 | .55 |
| 7 | 0 | 1 | 1 | 0 | .55 |
| 8 | 0 | 1 | 1 | 1 | .6 |
| 9 | 1 | 0 | 0 | 0 | 0 |
| 10 | 1 | 0 | 0 | 1 | .55 |
| 11 | 1 | 0 | 1 | 0 | .55 |
| 12 | 1 | 0 | 1 | 1 | .6 |
| 13 | 1 | 1 | 0 | 0 | 0 |
| 14 | 1 | 1 | 0 | 1 | .7 |
| 15 | 1 | 1 | 1 | 0 | .7 |
| 16 | 1 | 1 | 1 | 1 | 1.0 |

FIG. 4

SYSTEM AND METHOD FOR CALCULATING CLUSTER TOOL PERFORMANCE METRICS USING A WEIGHTED CONFIGURATION MATRIX

BACKGROUND OF THE INVENTION

1. Field of the Invention

This invention relates to measurement of the performance of integrated circuit fabrication tools and, more particularly, to a method for measuring performance of cluster tools.

2. Description of the Relevant Art

An article titled "Cluster Tool Performance Tracking" (by Vallabh H. Dhudshia and Clyde Hepner, of Texas Instruments, Inc., "Future Fab International", Issue 1, Volume 1, Technology Publishing, Ltd., 1996) stated, "The world of semiconductor processing has continued to evolve toward more complex manufacturing equipment and systems. Single chamber, single process equipment has been progressively replaced by multi-chamber systems." Multi-chamber tools are also referred to as "cluster tools."

The Semiconductor Equipment and Materials International (SEMI) E10-96 standard Guideline for Definition and Measurement of Equipment Reliability, Availability, and Maintainability (RAM) is hereinafter referred to as "E10" or the "E10 standard" and is incorporated by reference in its entirety. The E10 standard broadly defines a cluster tool as "a manufacturing system made up of integrated processing modules mechanically linked together (the modules may or may not come from the same supplier)." Examples of cluster tool modules include process chambers, transfer robots, vacuum pumps, and gas systems.

A paper "Managing Multi-chamber Tool Productivity" (by Bruce Aches, Gulsher Gewal, and Peter Silverman, of the Intel Corporation, Santa Clara, Calif., published at the "1995 IEEE/SEMI Advanced Semiconductor Manufacturing Conference") states, "Multi-chamber tools have enabled significant technical breakthroughs in wafer processing in the last decade. Expenditures for these tools are increasing as a percentage of the total capital base. Fully one-third of the capital dollars invested in 0.4 micron technology processing equipment will be spent on multi-chamber tools." The paper goes on to state, "By transferring wafers between process steps through a vacuum load-lock, multi-chamber tools significantly reduce contamination as compared to systems that allow exposure to air during transfer for many applications. For this and other reasons, highly integrated process applications such as multi-layer metal deposition, clean/deposition and deposition/etch sequences using multi-chamber tool technology are becoming more pervasive."

Broadly speaking, cluster tools may be classified as either "sequential" or "parallel" tools. Sequential tools are also commonly referred to as "serial" tools. A serial tool processes a wafer in a series of sub-steps performed in different modules of the serial tool. The sub-steps are commonly referred to as a "recipe." Therefore, when one module of a sequential tool is "down", i.e., inoperable to perform its sub-step, the entire tool cannot produce any product by a recipe requiring that a sub-step to be performed by the inoperable tool. Only when all of the modules of the sequential tool required by a given recipe are "up", i.e., operable to perform their designated process sub-step or operation, is the tool capable of producing the desired product according to the recipe. However, it is common for a process tool to be capable of performing multiple recipes. Hence, a recipe which does not require the down module may still be run and produce the desired product. Product is defined as any unit which is intended to include a functional device. A unit is defined as any wafer, die, packaged device, or piece part thereof. Examples of processing operations performed by process chamber modules are metal deposition, oxide growth, and source/drain implant.

In contrast to sequential cluster tools, when one or more modules of a parallel cluster tool are inoperable, the remaining modules of the tool may or may not be capable of continuing to produce product, albeit at a reduced rate, i.e., with reduced performance. The Auches paper states, "It is misleading to consider the tool up to production when in reality it cannot produce at a full run rate. It is equally misleading to consider the tool completely down when the tool can produce wafers, although at a reduced run rate."

Cluster tools are typically relatively expensive pieces of equipment. The Auches paper states that the most sophisticated cluster tools on the market today cost approximately between one million and two million dollars. Accurately determining the performance of these expensive cluster tools may enable a company to make more informed decisions about whether to procure, or to postpone procuring, additional processing tools in order to meet production demands. Therefore, it is desirable to accurately determine the performance of cluster tools.

Various measures of the performance of equipment have been developed over the past few decades. An example of these performance measures is the SEMI E10-96 standard, which defines states and formulae for determining the reliability, availability, maintainability, and utilization of process tools.

Another example of an industry accepted performance measure is the overall equipment effectiveness (OEE) metric. The OEE metric defines formulae based on the availability, operational efficiency, rate efficiency, and rate of quality for computing the effectiveness of process tools. These performance measures have been defined and effectively applied to single chamber integrated circuit fabrication tools.

A limitation of the E10 and OEE performance measures is that the states and metrics defined by them are directly applicable only to single chamber tools. This limitation is due mainly to the complexity of cluster tool operations. The following example with reference to FIG. 1 examines the availability of a cluster tool and illustrates the problems associated with applying currently defined performance measurement standards to cluster tools. Availability relates to the time which a process tool is available to perform wafer fabrication operations relative to the total time over which the performance is to be measured.

The cluster tool 8 from Novellus® Systems, Inc. of FIG. 1 can be defined as having five modules: two process chambers 8A and 8B, two loadlock chambers 8D and 8E, and a transfer robot 8C for transferring wafer cassettes between the loadlock chambers 8D and 8E and the process chambers 8A and 8B. The cluster tool 8 is inoperable as a whole if the transfer robot 8C is down, if both of the process chambers 8A and 8B are down, or if both of the loadlock chambers 8D and 8E are down. If one of the process chambers 8A or 8B is down, or if one of the loadlock chambers 8D or 8E is down, or if one process chamber and one loadlock chamber are down, the cluster tool 8 is still operable, however, at a reduced performance relative to a configuration where all of the modules are operable.

In a scenario where the transfer robot 8C is up for an entire week, i.e., the availability of the transfer robot 8C is 100% for 168 hours, but both of the process chambers 8A and 8B are up for only 100 hours and down the other 68 hours, the question arises, "what is the availability of the cluster tool as a whole over the 168 hour period?" The E10 and OEE standards do not currently provide an answer to such a question. Therefore, an improved method for determining the performance of cluster tools is desired.

SUMMARY OF THE INVENTION

The problems outlined above are in large part solved by the system and method for calculating cluster tool performance using a weighted configuration matrix of the present invention. The method employs a weighted configuration matrix to derive meaningful E10 metrics and OEE components for cluster tools. The method is based upon the impact to production capacity caused by individual modules in a cluster tool being in an operable or inoperable state. The method advantageously is user configurable, is applicable to different types of cluster tools, and does not require extra data tracking beyond what is already tracked for the individual modules of the cluster tool.

In one embodiment, a computer system is coupled to a cluster tool. The cluster tool includes a plurality of processing modules mechanically linked together. The computer system executes a manufacturing execution system (MES) which controls the processing workflow of the fab where the cluster tool 14 resides. The MES maintains a list of entities in the fab, including each of the processing modules in the fab. The computer system enables a user to designate which of the MES entities make up the cluster tool and to designate a main module of the cluster tool. The computer system logs tool activity information provided by an operator of the tool or by the tool itself in the MES. The tool activity information includes wafer count, failure count, assist count, cycle, and event information, such as begin run, end run, engineering experiment, down to maintenance, and down for repair. A data tracking convention is provided which specifies which types of events and counts are to be logged against the main module and which are to be logged against the other modules.

After the user has "clustered" the modules of the cluster tool and selected key modules and a main module, the computer system configures all of the known "up" and "down", i.e., operable and inoperable, state configuration combinations of the cluster tool modules. Examples of "known" combinations are those in which all the modules are up or combinations in which a key module is down. The current matrix is then displayed to the user and the user is then allowed to configure the remaining possible combinations. The number of state configuration combinations is 2 to the N, where N is the number of modules in the cluster tool. The user specifies a weight for each of the configurations based upon an estimate of the performance of the cluster tool while in the respective configuration associated with the weight. The user may choose the weights based upon any suitable criteria, such as the throughput of wafers capable of being processed by the cluster tool in each of the respective configurations, the number of wafer processes capable of being performed by the cluster tool in each of the respective configurations, or the economic value added (EVA) by the wafer processes capable of being performed by the cluster tool in each of the respective configurations. Preferably, the weight values chosen are between zero and one, inclusive, to indicate a percentage of the fully operable performance of the cluster tool. That is, the weight is chosen to indicate the performance of the cluster tool in the given configuration relative to the performance of the cluster tool in a fully operable configuration, i.e., when each module of the cluster tool is up.

The computer system then places the configurations and received weights into a weighted configuration matrix. The computer system calculates the performance of the cluster tool using the configuration matrix and the accumulated tool activity information. In particular, the E10 metrics and OEE metric components are calculated as a measure of the performance of the cluster tool over a total period of time. The present invention defines a number of formulas for calculating various of the metrics based on the configuration matrix. Preferably, once the performance of the cluster tool is calculated, the results are displayed for the user on a display screen of the computer system.

Broadly speaking, the method for calculating the performance of the cluster tool includes configuring each of the modules in either an operable or inoperable state to produce a plurality of cluster tool configurations and assigning a weight to each of the configurations estimated to be dependent upon the performance of the cluster tool while in each of the respective configurations. A matrix of configurations is compiled from each of the assigned weights and the performance of the cluster tool is calculated based upon the matrix of configurations.

BRIEF DESCRIPTION OF THE DRAWINGS

Other objects and advantages of the invention will become apparent upon reading the following detailed description and upon reference to the accompanying drawings in which:

FIG. 4 is a table illustrating an exemplary configuration matrix for the cluster tool of FIG. 2.

Figure 1:
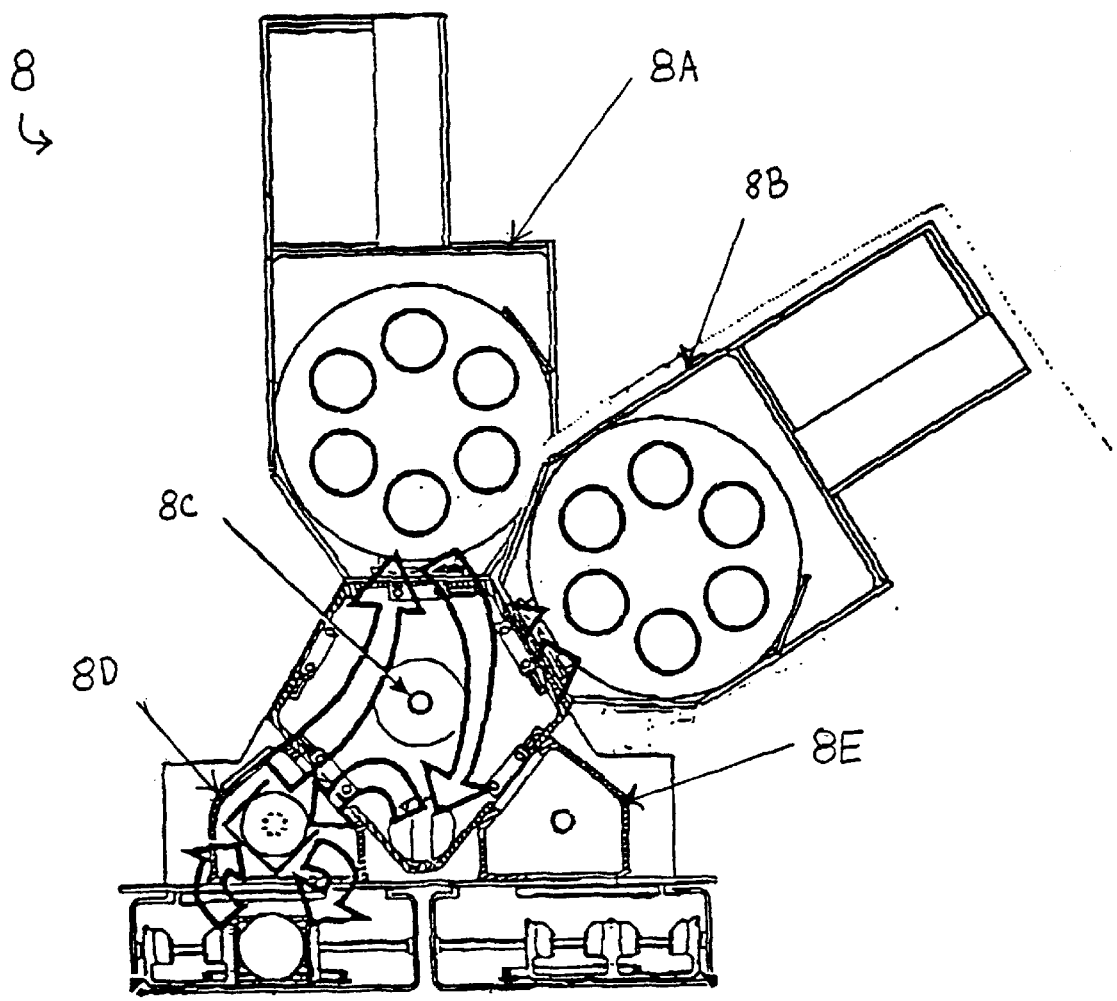
FIG. 1 is an exemplary cluster tool.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
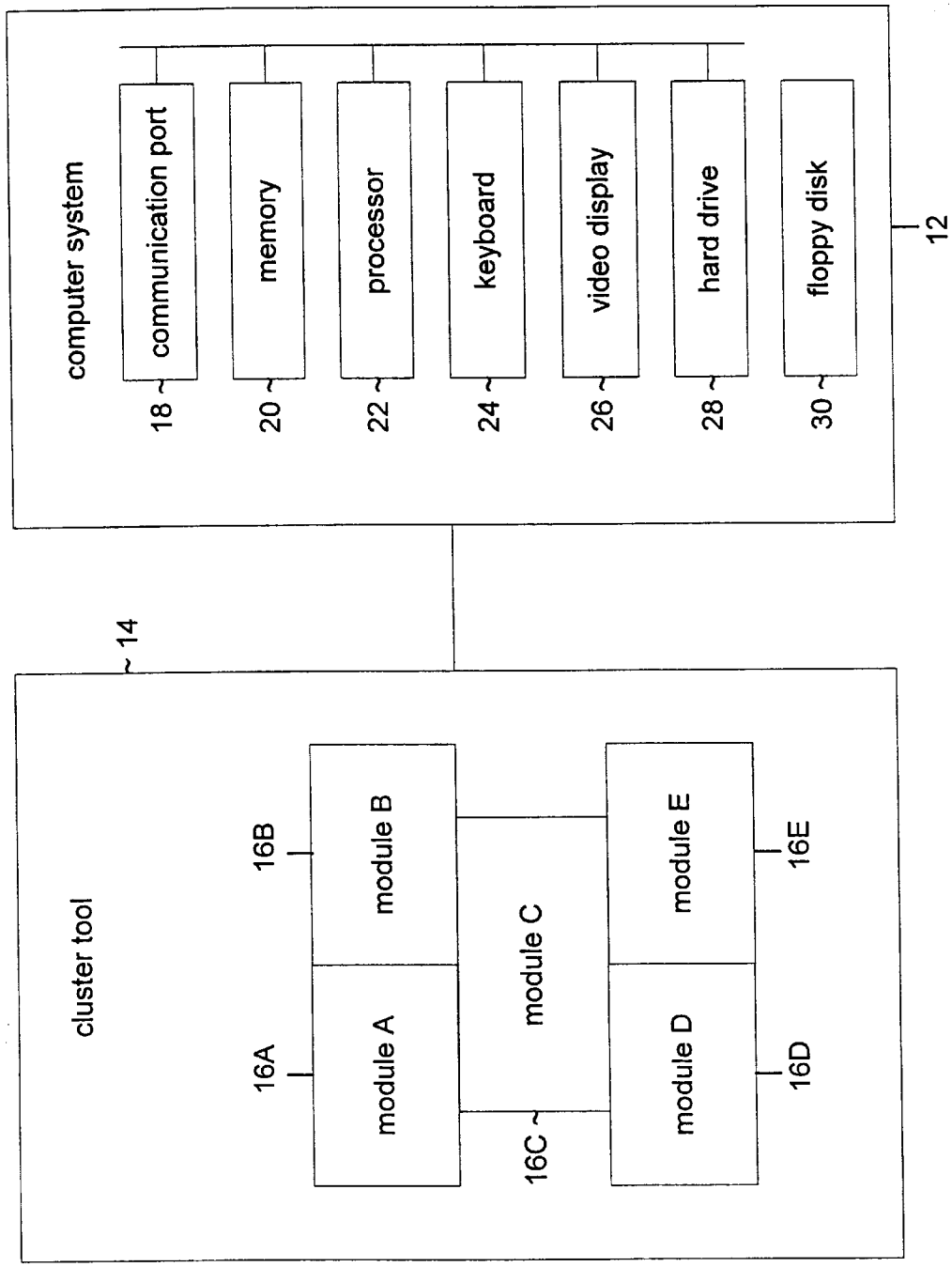
FIG. 2 is a block diagram of a system for calculating cluster tool performance metrics according to the preferred embodiment.

Referring now to FIG. 2, a block diagram of a system 10 for calculating cluster tool performance metrics according to a preferred embodiment is shown. The system 10 includes a cluster tool 14 and a computer system 12 coupled to the cluster tool 14 for calculating the performance of the cluster tool 14. The cluster tool 14 of FIG. 2 is representative of cluster tools in general. However, it will be recognized by those skilled in the art that many different cluster tool types exist with various module groupings and couplings. Cluster tool 14 is given by way of example to aid in describing the present invention.

The cluster tool 14 includes a plurality of modules 16A through 16E (referred to collectively as 16). The modules 16, are individual wafer fabrication process tools, such as process chambers, transfer robots, vacuum pumps, and gas systems physically linked together to perform wafer processing operations.

Preferably the cluster tool 14 is operated within a semiconductor wafer fabrication facility, or fab. Preferably, a manufacturing execution system (MES) controls the processing workflow of the fab where the cluster tool 14 resides. An operator of the cluster tool 14 receives information from the MES regarding actions which the operator should take in processing wafers in the cluster tool 14. In addition, the operator provides tool activity information to the MES and the computer system 12 logs the tool activity information in the MES. The user provides the tool activity information to the computer system 12 through a user interface of the computer system 12. The tool activity information includes, for example, begin run events, end run events, engineering experiment events, begin process events, end process events, down for maintenance events, down for preventative maintenance events, down for repair events, failures, assists, number of wafers submitted to the tool for processing, number of wafers successfully processed, number of wafers reworked, number of wafers scrapped, etc. The tool activity information is used in determining the performance of the tool 14. Furthermore, the cluster tool 14 may automatically generate events which the MES receives and tracks.

Preferably, a module is an entity which is defined in the MES and for which the MES tracks events. In one embodiment, a module may also be a "virtual" entity defined by the MES, i.e., a module which does not correspond to a physical entity. Preferably, the system 10 enables a user to define a virtual entity, i.e., a virtual module.

In one embodiment, the MES is the WorkStream® product, available from Consilium®, Inc., of Mountain View, Calif. In one embodiment, the WorkStream MES executes on the computer system 12. Preferably, each of the modules 16 exists as an entity in the MES, however, the cluster tool 14 as a whole does not exist as an entity in the MES.

Preferably, the modules 16 include one or more key modules. A key module is a module which when inoperable renders the entire cluster tool 14 inoperable. A module is defined as inoperable if it is in a state such that it cannot perform its intended wafer processing step. Conversely, a module is defined as operable if it is in a state such that it can perform its intended wafer processing step.

For illustration purposes, assume that the cluster tool 14 of FIG. 2 is the cluster tool 8 of FIG. 1. Modules 16A and 16B correspond to the two process chamber modules 8A and 8B, respectively, of FIG. 1, modules 16D and 16E correspond to the two loadlock chambers 8D and 8E, respectively, of FIG. 1, and module 16C corresponds to the transfer robot 8C of FIG. 1. In this scenario, the transfer robot module 16C is a key module since the cluster tool 14 is inoperable if the transfer robot 16C is inoperable, since no wafers may be processed by the process chambers 16A and 16B if the transfer robot 16C is inoperable to transfer wafers from the loadlock chambers 16D and 16E to the process chambers 16A and 16B.

When a module is inoperable, the module is said to be "down", or in a down state. Preferably, the down states are the unscheduled downtime and scheduled downtime states as defined by the E10 standard. When a module is operable, the module is said to be "up", or in an up state. Preferably, the up states are the engineering time, standby time and productive time states as defined by the E10 standard. The events tracked by the MES for each of the modules 16 are used to determine the amounts of time which the modules 16 spend in each of the E10 states. Related U.S. patent application Ser. No. 08/781,392 titled "System and Method for Reporting Overall Equipment Effectiveness" filed Dec. 10, 1996 now pending, whose inventors were Qingsu Wang and R. Michael Greig, and which is assigned to Advanced Micro Devices, Inc., discusses the mapping of WorkStream events to E10 states and the accumulation of other information used in the calculation of OEE metrics for single chamber process tools and is hereby incorporated by reference in its entirety as though fully and completely set forth herein.

When a non-key module is inoperable, the cluster tool may continue to operate and process wafers, albeit at a reduced performance rate relative to the performance rate of the cluster tool when all modules are operable. For example, if the cluster tool 14 is in a configuration such that only one of the process chambers 16A and 16B is inoperable, then the cluster tool 14 may continue to operate, but at a reduced performance rate. In a configuration where more than one non-key module is inoperable, the cluster tool 14 may or may not be inoperable, depending upon which of the more than one non-key modules is inoperable. For example, in a configuration where both of the process chambers 16A and 16B are down then the entire cluster tool 14 is inoperable.

One of the key modules is selected as a main module. That is, the main module is a key module. If there is only one key module in a cluster, the single key module is the main module. Preferably, the computer system 12 provides a user interface by which a user of the cluster tool 14 may select the main module from among the modules 16 of the cluster tool 14. Events signifying the main operations of the cluster are logged against the main module, as will be discussed, infra. In the example cluster tool 14, the transfer robot 16C is the main module since it is the only key module.

The computer system 12 is operably coupled to the cluster tool 14. In one embodiment, the computer system 12 is operably coupled to the cluster tool 14 via one or more asynchronous serial interfaces, such as an RS-232 interface, wherein the computer system 12 and cluster tool 14 communicate via the SECS-II protocol. Preferably, each of the modules 16 of the cluster tool 14 includes a serial interface coupled to the computer system 12, whereby the modules 16 communicate event information to the MES executing on the computer system 12.

The computer system 12 comprises a processor 22 for performing various functions, such as calculating the performance of the cluster tool 14, executing the MES, and mapping event information to E10 state information. A memory 20 is coupled to the processor 22 for storing software programs, such as the MES, storing event, wafer count, cycle, and interrupt count information, and storing the calculated performance information. A communication port 18 is operably coupled to the processor 22 and communicates with the modules 16 of the cluster tool 14.

A keyboard 24 or other suitable input device, such as a mouse, is operably coupled to the memory 20 for receiving user input. A video display 26 is operably coupled to the memory 20 for displaying information to the user, such as the calculated performance of the cluster tool 14. The input received from the user and the information displayed on the video display 26 will be described in more detail, infra. A permanent storage media, such as a hard drive 28, is operably coupled to the memory 20 for storing software programs, such as the MES, storing event, wafer count, cycle, and interrupt count information, and storing the calculated performance information.

Software which executes on the computer system 12 includes a user interface, which employs the input devices of the computer system 12, such as the keyboard 24 or a mouse, to receive user input. The user interface further employs display devices, such as the video display 26 or a printer, to provide output information to the user.

In one embodiment, the computer system 12 comprises a plurality of computers networked together to perform functions of executing the MES, logging event information and wafer count information, mapping event information to E10 state information, receiving user input, calculating performance of the cluster tool 14, and displaying the calculated performance.

Figure 3:
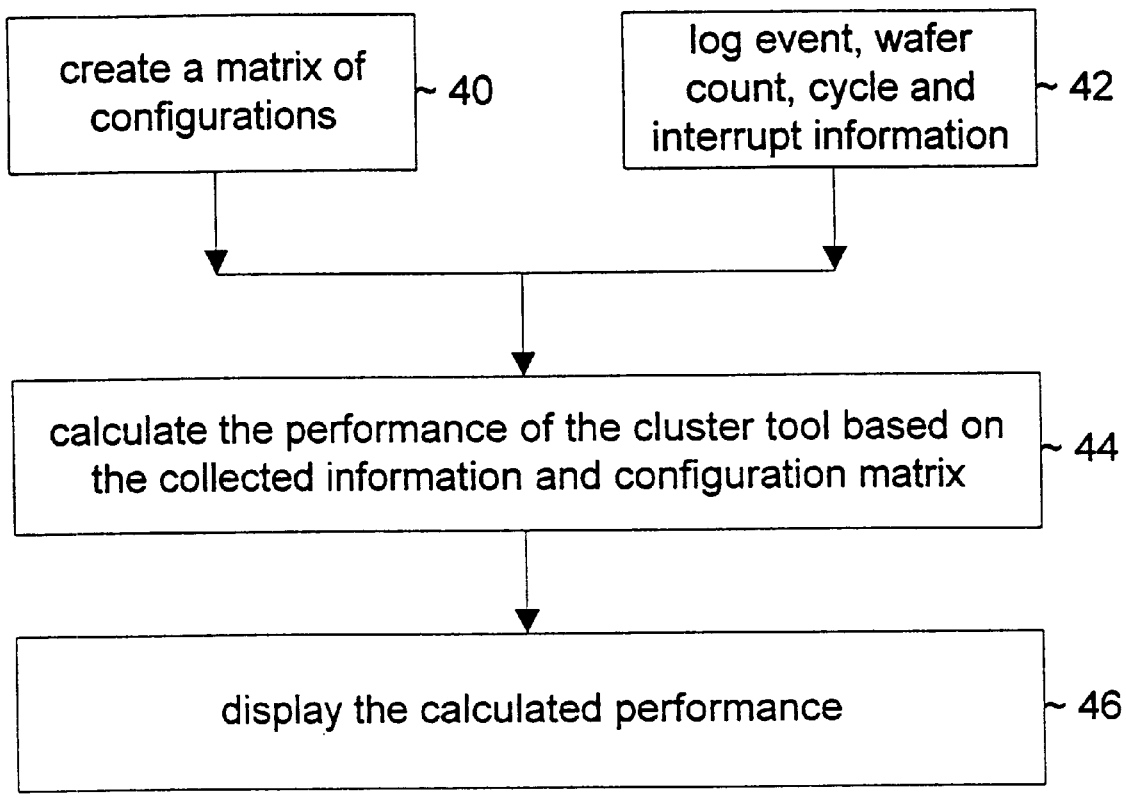
FIG. 3 is a flowchart illustrating steps performed by the computer system of FIG. 2 in calculating performance of the cluster tool of FIG. 2.

Referring now to FIG. 3, a flowchart illustrating steps performed by the computer system 12 of FIG. 2 in calculating performance of the cluster tool 14 of FIG. 2 is shown. A configuration matrix is created, in step 40. FIG. 4 is a table illustrating an exemplary configuration matrix for the cluster tool 14 of FIG. 2. The configuration matrix is used in calculating the performance of the cluster tool 14.

Figure 5:
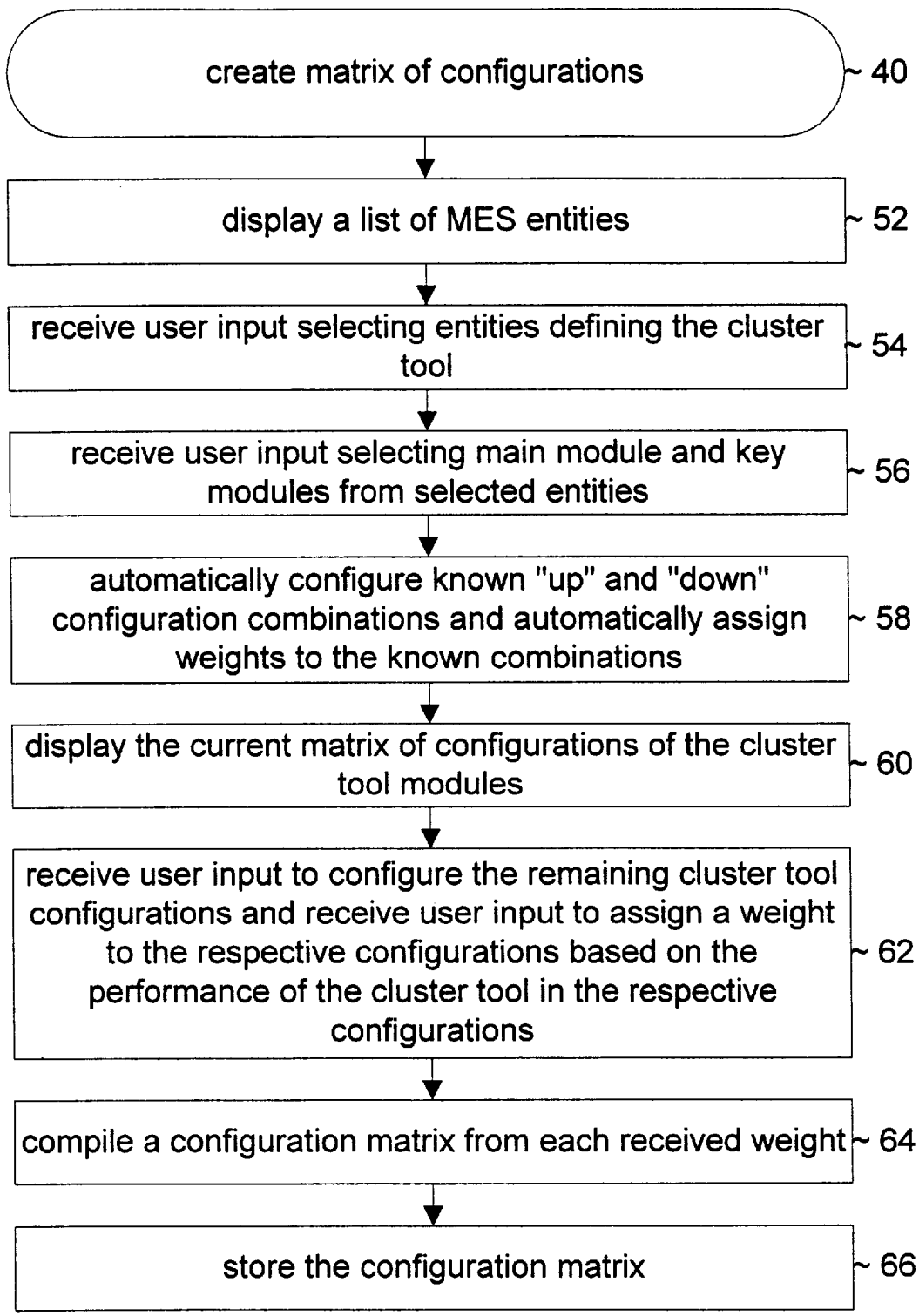
FIG. 5 is a flowchart illustrating in more detail steps taken to create a configuration matrix such as that of FIG. 4.

Referring now to FIG. 5, a flowchart illustrating in more detail step 40 of FIG. 3 for creating a configuration matrix such as that of FIG. 4 is shown. Preferably, each of the modules 16 exists as an entity in the MES, however, the cluster tool 14 as a whole does not exist as an entity in the MES. The user interface of the computer system 12 displays a list of entities which exist in the MES to the user, in step 52. Preferably, the list displayed includes each of the entities known to the MES, such as each of the modules in the fab where the cluster tool 14 resides. In one embodiment, the user is enabled to narrow the list of entities displayed by providing appropriate information.

In general, MES entities correspond to process modules. In one embodiment, an entity may also be a "virtual" entity defined by the MES, i.e., an entity which does not correspond to a physical process module. Preferably, the user interface enables a user to define a virtual entity, i.e., a virtual module against which events may be logged, and which may be selected as one of the entities defining the cluster tool 14. The selection of the entities defining the cluster tool 14 will be described with regard to step 54. In particular, virtual entities are useful in tracking operational events on an entire cluster tool.

The user selects a plurality of modules from the list of displayed entities as the constituent modules of the cluster tool 14. Preferably, the list selected by the user corresponds to the modules 16 of the cluster tool 14, and optionally any virtual modules which the user may have defined. The user interface receives the entity selection information, in step 54, and stores the module selection information, such as in the memory 20 or hard drive 28 of the computer system 12.

Once the user has selected the modules of the cluster tool 14, the user interface enables the user to select a main module from among the modules of the cluster tool 14 previously selected in step 54. The user interface receives the user selection of the main module and key modules, in step 56, and stores the main module selection information. The computer system 12 uses the stored selected module and selected main module information in calculating the performance of the cluster tool 14 as described herein.

After receiving the user input selecting the main and key modules, the computer system 12 then automatically configures any know configuration combinations and automatically assigns weights to the known configuration combinations, in step 58. Preferably, a configuration is defined as a combination of one state for each of the selected modules, wherein the allowable states are "up" and "down". By convention, a value of 1 is associated with an up state and a value of 0 is associated with a down state. Hence, the possible configurations may be likened to the possible binary combinations of inputs, wherein an input is a state of one of the selected modules. In the configuration matrix of FIG. 4, each row of the matrix is a configuration.

An example of a known configuration combination is a configuration combination in which a key module is down. In a combination in which a key module is down, the system 12 will assign a weight of 0. Another example of a known configuration combination is a configuration combination in which all modules are up. In a combination in which all modules are down, the system 12 will assign a weight of 1.

After automatically configuring the known combinations and assigning a weight to each of the known combinations, the computer system 12 then displays the current configuration matrix for the user, in step 60. Preferably, the computer system 12 does not include the main module in creating the matrix since by definition the cluster tool is inoperable for any configuration in which the main module is down, thus the weight is known for all such configurations. As a result, the configuration matrix of FIG. 4 for the cluster tool 14 includes sixteen possible configurations, since there are four modules which are not the main module and there are sixteen possible combinations of four binary states.

The user then provides input to the user interface to configure any or all of the remaining combinations and assigns a weight to each of the configurations. The remaining configuration combinations include the set of possible configuration combinations which are not automatically configured by step 58. The user interface receives the user configuration combination and weight assignment inputs which are chosen based upon an estimate by the user of the performance of the cluster tool in each of the respective configurations, in step 62.

Preferably, the user may assign weights for a limited number of the remaining configurations, i.e., the user is not required to assign a weight for each of the remaining configurations. Preferably, when a configuration occurs during production which has not been configured or assigned a weight, the system 12 will assign a default weight value to the configuration and use the default value in making performance calculations. Preferably, the system 12 notifies the user that an undefined configuration has been encountered. The user may then assign a weight to the undefined configuration and regenerate the calculations. In one embodiment, the default weight value is 1.

After receiving the weight assignment inputs from the user, the computer system 12 compiles a configuration matrix using the received weight assignments and configurations, in step 64, and stores the configuration matrix for future use in calculating the performance of the cluster tool 14, in step 66.

Advantageously, the method of the present invention if flexible such that it enables the user to select values for the weights of the configuration matrix in step 62 based upon whatever criteria the user deems appropriate as an estimate of the performance of the cluster tool 14 while in the respective configuration associated with the weight. Preferably, the weight values chosen are between zero and one, inclusive, to indicate a percentage of the fully operable performance which the cluster tool 14 is capable of providing. That is, the weight is chosen to indicate the performance of the cluster tool 14 in the given configuration relative to the performance of the cluster tool 14 in a fully operable configuration, i.e., when each module of the cluster tool 14 is up.

In one embodiment, the user selects the weight values as estimated to be dependent upon the throughput of wafers capable of being processed by the cluster tool while in each of the respective configurations. For example, if the tool is capable of producing 100 wafers per hour in a fully operable configuration, but only 60 wafers per hour in a particular configuration, then the user might assign a weight of 0.6 to the particular configuration.

In another embodiment, the user selects the weight values as estimated to be dependent upon the number of wafer processes capable of being performed by the cluster tool while in each of the respective configurations. For example, if the tool is capable of performing 10 different processes in a fully operable configuration, but only 3 processes in a particular configuration, then the user might assign a weight of 0.3 to the particular configuration.

In another embodiment, the user selects the weight values as estimated to be dependent upon the economic value added (EVA) by the cluster tool while in each of the respective configurations. For example, the tool may be capable of performing 3different processes, A, B, and C, in a fully operable configuration. Process A produces wafers with microprocessor circuits which have an average selling price (ASP) of $80 each. Process B produces wafers with dynamic random access memories (DRAM) which have an ASP of $10 each. Process C produces wafers with static random access memories (SRAM) which have an ASP of $10 each. If a particular configuration is only capable of performing processes B and C, then the user might assign a weight of 0.2 to the particular configuration.

Configuration 16 in the configuration matrix of FIG. 4 is assigned a weight of one, since each module of the cluster tool 14 is up and thus the cluster tool 14 is capable of performing at its full capacity. Conversely, in all of the combinations in FIG. 4 in which both process chambers or both loadlock chambers are down, the weight assigned by the user is zero, since the throughput of the cluster tool 14 is zero, i.e., no wafers may be produced, in those configurations.

The configurations in which at least one loadlock chamber and at least one process chamber are up, receive a weight which has a value between zero and one, since the cluster tool 14 may produce wafers in those configurations, but at a reduced performance relative to configuration 16. In these configurations, the weights were chosen as a function of the decrease in throughput. Thus, the configuration matrix creation method advantageously enables a skilled user, such as an engineer or operator of the cluster tool 14 to apply his or her experience and expertise with the cluster tool 14 to calculating the performance of the cluster tool 14, particularly in non-fully-operable configurations. The method is advantageously flexible, useable and easily understandable by the user.

Referring again to FIG. 3, the computer system 12 logs event, wafer count, cycle time, and interrupt information, referred to as "tool activity information" henceforth, in step 42. Preferably, the tool activity information includes information, such as begin run events, end run events, engineering experiment events, begin process events, end process events, down to maintenance events, down for preventative maintenance events, down for repair events, failures, assists, number of wafers submitted to the tool for processing, number of wafers successfully processed, number of wafers reworked, number of wafers scrapped, etc. A begin run event is logged when a process tool begins processing a run of wafers. An end run event is logged when a process tool finishes processing a run of wafers. The user may create the configuration matrix prior to logging the tool activity information, i.e., before processing of the wafers, during processing of the wafers, or after processing of the wafers.

The tool activity information includes time stamps, which enable the computer system 12 to determine the amount of time which each of the modules of the cluster tool 14 spends in each of the E10 states. These determined amounts of time are used to calculate the performance of the cluster tool 14, such as the OEE and E10 metrics. As mentioned previously, the E10 states are defined in the E10 standard. In addition, the E10 standard defines assists, failures, interrupts and other entities used in evaluating performance of process tools. For convenience, a list of definitions is provided, infra.

An assist is defined as an unplanned interruption that occurs during an equipment cycle where all three of the following conditions apply: the interrupted equipment cycle is resumed through external intervention (e.g., by an operator or user, either human or host computer); there is no replacement of a part, other than specified consumables; there is no further variation from specifications of equipment operation.

A cycle, or equipment cycle, is defined as one complete operational sequence (including product load and unload) of processing, manufacturing, or testing steps for an equipment system or subsystem. In single unit processing systems, the number of cycles equals the number of units processed. In batch systems, the number of cycles equals the number of batches processed.

A failure, or equipment failure, is defined as any unplanned interruption or variance from the specifications of equipment operation other than assists.

An interrupt is defined as any assist or failure. The number of interrupts equals the sum of the number of assists and the sum of the number of failures.

Productive state designates a period of time during which the equipment is performing its intended function and includes regular production, including product loading and unloading, work for third parties, rework, production tests and engineering runs performed in conjunction with production.

Standby state designates a period of time, other than nonscheduled time, during which the equipment is in a condition to perform its intended function, but is not operated, and includes such equipment states as no operator available, no product available, no support tools, awaiting results of production tests. Nonscheduled time is defined as a period of time during which the equipment is not scheduled to be utilized in production.

Engineering state designates a period of time during which the equipment is in a condition to perform its intended function, but is instead operated to conduct engineering experiments and includes process engineering and equipment engineering.

Scheduled downtime state designates a period of time during which the equipment is not available to perform its intended function due to planned downtime events, such as scheduled maintenance.

Unscheduled downtime state designates a period of time during which the equipment is not in a condition to perform its intended functions due to unplanned downtime events, such as unscheduled maintenance.

Nonscheduled state designates a period of time during which the equipment is not scheduled to be utilized in production, such as unworked shifts, weekends and holidays, including shutdown and start-up. Shutdown is defined as the time required to put the equipment in a safe condition when entering a nonscheduled state. Shutdown is only included in nonscheduled time. Start-up is defined as the time required for equipment to achieve a condition in which it can perform its intended function when leaving a nonscheduled state. Start-up is only included in nonscheduled time.

Preferably, the computer system 12 imposes a data tracking convention for logging the tool activity information. According to the data tracking convention, failures, assists, and maintenance events for a module (such as down to maintenance and down for preventative maintenance) are logged only against the particular module on which the failure, assist or maintenance event occurred. Maintenance events for the entire cluster, production cycles, and production events are logged only against the main module.

According to the data tracking convention, a new sub-state of the E10 standby state, "standby due to other module down" (SBY-XDOWN) is provided. A module is determined to be in the SBY-XDOWN sub-state if a module is up while a key module is down.

Ideal cycle times (ICT) are used in calculating the OEE metric for process tools. The ICT includes the time required to load, process, and unload the wafers only. The time required for MES and other logging, metrology measurements, inserting test wafers, loading wafer cassettes, filling out run cards, wafer cleans, inspections, etc. are not included in the ICT calculations. Wafers are processed according to specification and as rapidly as possible during the ICT determination process. In some cases, the ICT may be acquired from the manufacturer of the equipment. The "System and Method for Reporting Overall Equipment Effectiveness" patent application previously incorporated by reference, supra, describes in detail a method for determining ICTs. Preferably, ideal cycle times are assigned only to the main module of the cluster tool 14.

Referring again to FIG. 3, the computer system 12 calculates the performance of the cluster tool 14 over a given period of time based on the collected tool activity information and the created configuration matrix, in step 44, and displays the calculated performance in step 46. Preferably, calculating the performance of the cluster tool 14 comprises calculating a standard performance metric, such as the E10 metric or OEE component metrics.

Preferably, calculating the E10 and OEE metrics is performed according to the formulas listed below. In the formulas below, "mo" refers to the main module of the cluster tool, "$m_1, m_2, \ldots, m_n$" refer to the other modules of the cluster tool, and "m" is the number of modules which have the time items described in the formula, such as the number of modules with facility downtime, the number of modules with user maintenance time, etc. The times and counts for an individual module, such as specified below, e.g., "Facility Downtime of $m_i$", are as defined in the E10 standard. The quantities computed, e.g., "Assists", represent the quantity for the cluster tool 14, as opposed to the quantity for an individual module unless otherwise specified.

$$\text{Assists} = \sum_{i=0}^{n} \text{Assists of } m_i$$

$$\text{Failures} = \sum_{i=0}^{n} \text{Failures of } m_i$$

$$\text{Interrupts} = \sum_{i=0}^{n} \text{Failures of } m_i + \sum_{i=0}^{n} \text{Assists of } m_i$$

$$\text{Non-Machine Failures} = \sum_{i=0}^{n} \text{Non-Machine Failures of } m_i$$

$$\text{PM Counts} = \sum_{i=0}^{n} \text{PM Counts of } m_i$$

$$\text{Downtime Incidents} = \sum_{i=0}^{n} \text{Failures of } m_i + \sum_{i=0}^{n} \text{PM Counts of } m_i$$

$$\text{Cycles} = \text{Cycles of } m_0$$

$$\text{Scheduled Downtime} = \text{Scheduled Downtime of } m_0$$

-continued $$\text{Repair Time} = \left(\sum_{i=0}^{n} \text{Repair Time of } m_i\right) \Big/ m$$

$$\text{Maintenance Time} = \left(\sum_{i=0}^{n} \text{Maintenance Time of } m_i\right) \Big/ m$$

$$\text{User Maintenance Time} = \left(\sum_{i=0}^{n} \text{User Maintenance Time of } m_i\right) \Big/ m$$

$$\text{Facility Downtime} = \left(\sum_{i=0}^{n} \text{Facility Downtime of } m_i\right) \Big/ m$$

$$\text{Spec Input Downtime} = \left(\sum_{i=0}^{n} \text{Spec Input Downtime of } m_i\right) \Big/ m$$

$$\text{Re-Qual Time} = \left(\sum_{i=0}^{n} \text{Re-Qual Time of } m_i\right) \Big/ m$$

Non-Scheduled Time = Non-Scheduled of $m_0$

Operations Time = Operations Time of $m_0$

Total Time = Total Time of $m_0$

Uptime = Uptime of $m_0$ × weight

Productive Time = Productive Time of $m_0$ × weight

Engineering Time = Engineering Time of $m_0$

Qual Time = Qual Time of $m_0$

Standby Time = Uptime − Engineering Time − Productive Time

Standby No WIP = Standby No WIP of $m_0$

Downtime = Total Time − Non-Scheduled Time − Uptime

Unscheduled Downtime = Downtime − Scheduled Downtime $$\text{MTBFp} = \frac{\text{productive\_time}}{\text{\# of\_failures\_in\_productive\_time}}$$

$$\text{MTBFms} = \frac{\text{productive\_time}}{\text{\# of\_machine\_failures\_in\_productive\_time}}$$

-continued $$\text{MTBAp} = \frac{\text{productive\_time}}{\text{\# of\_assists}}$$

$$\text{MTBIp} = \frac{\text{productive\_time}}{\text{\# of\_interrupts}}$$

$$\text{MCBF} = \frac{\text{total\_equipment\_cycles}}{\text{\# of\_failures}}$$

$$\text{MCBA} = \frac{\text{total\_equipment\_cycles}}{\text{\# of\_assists}}$$

$$\text{MCBI} = \frac{\text{total\_equipment\_cycles}}{\text{\# of\_interrupts}}$$

$$\text{operational uptime\%} = \frac{\text{equipment\_uptime}}{\text{operations\_time}} * 100$$

equipment dependent uptime % =

$$\frac{\text{equipment\_uptime}}{\text{operations\_time} - (\text{all\_main\_delay} + \text{out\_of\_spec\_inputDT} + \text{fac\_relDT})} * 100$$

supplier dependent uptime % =

$$\frac{\text{equipment\_uptime}}{\text{operations\_time} - (\text{user\_main\_delay} + \text{out\_of\_spec\_inputDT} + \text{fac\_relDT})} * 100$$

$$\text{total utilization\%} = \frac{\text{productive\_time}}{\text{total\_time}} * 100$$

$$\text{operational utilization\%} = \frac{\text{productive\_time}}{\text{operations\_time}} * 100$$

$$\text{equipment utilization capability} = \frac{\text{total\_time} - \text{downtime}}{\text{total\_time}} * 100$$

$$\text{production utilization capability} = \frac{\text{total\_time} - \text{downtime} - \text{qual\_time}}{\text{total\_time}} * 100$$

$$\text{MTOL} = \left( \sum_{i=0}^{n} \text{MTOL of } m_i \right) \Big/ \text{\# modules with failure or PM,}$$

where $\text{MTOL of } m_i = \dfrac{\text{total\_equipment\_downtime\_time of } m_i}{\text{\# of\_DTincidents of } m_i}$ $$\text{MTTR} = \left( \sum_{i=0}^{n} \text{MTTR of } m_i \right) \Big/ \text{\# modules with failure,}$$

-continued $$\text{where MTTR of } m_i = \frac{\text{total\_repair\_time of } m_i}{\text{\# of\_failures of } m_i}$$

$$\text{limited productive time} = \text{Total ProductiveTime of } m_0 - P_1,$$

where $P_1$ is the productive time of $m_0$ with weight equal 1.0

$$\text{percent limited productive time} = \frac{\text{limited\_productive\_time}}{\text{Total\_productive\_time of } m_0}$$

$$\text{Availability}(\%) = \frac{\text{equipment\_uptime}}{\text{total\_time}} * 100$$

$$\text{Operational Efficiency}(\%) = \frac{\text{productive\_time of } m_0}{\text{equipment\_uptime}} * 100$$

The configuration of the cluster tool, and therefore the weight, may not be constant during a given reporting time period. Therefore, the productive time and the uptime are calculated as the sum of products of the productive time and weight associated with each of the separate configurations during the given reporting time period.

For example, assume the configuration matrix of FIG. 4 is created for the cluster tool 14. Assume during a given week (i.e., the "total time" is 168 hours), the total productive time is 100 hours for the main module, with 20 hours spent in configuration 10, 30 hours spent in configuration 15, and 50 hours spent in configuration 8. Then the productive time of the cluster tool 14 is, productive time=(20×0.55)+(30×0.7)+(50×0.6)=62 hours.

A similar procedure is followed to calculate the uptime. Assume during the week the uptime is 150 hours for the main module, with 40 hours spent in configuration 10, 50 hours spent in configuration 15, and 60 hours spent in configuration 8. Then the uptime of the cluster tool 14 is, uptime=(40×0.55)+(50×0.7)+(60×0.6)=93 hours.

In the example above, the total utilization, for example, of the cluster tool 14 would be calculated as, total utilization (%)=62/168×100=37% and the availability, for example, of the cluster tool 14 would be calculated as, availability (%)=93/168×100=55%.

Thus the method for calculating performance of a cluster tool of the present invention advantageously applies standard E10 and OEE metrics without creating additional metrics or standards. The configuration matrix of the method is advantageously user configurable, thus users may choose weight factors based upon whatever criteria is desired. For example, the user may choose the weights based upon the throughput of wafers capable of being processed by the cluster tool in each of the respective configurations, the number of wafer processes capable of being performed by the cluster tool in each of the respective configurations, or the economic value added (EVA) by the wafer processes capable of being performed by the cluster tool in each of the respective configurations. Furthermore, the method advantageously does not require additional event logging beyond currently logged events for individual modules, i.e., for non-cluster tools. The present method is advantageously applicable to serial cluster tools, parallel cluster tools, or a combination thereof, and is consistent with the realistic and intuitive use of cluster tools.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for calculating performance of a cluster tool having a plurality of wafer processing modules, comprising:
    configuring each of said plurality of modules in either an operable or inoperable state to produce a plurality of cluster tool configurations;
    assigning a weight to each of said plurality of configurations estimated to be dependent upon the performance of said cluster tool while in respective said plurality of configurations; and
    compiling a matrix of configurations from each said weight assigned in accordance with the immediately preceding step, and calculating performance of said cluster tool based upon said matrix of configurations and actual activity information for said cluster tool.

2. The method of claim 1, wherein said assigning a weight to each of said plurality of configurations is estimated to be dependent upon the throughput of wafers capable of being processed by said cluster tool while in respective said plurality of configurations.

3. The method of claim 1, wherein said assigning a weight to each of said plurality of configurations is estimated to be dependent upon the number of wafer processes capable of being performed by said cluster tool while in respective said plurality of configurations.

4. The method of claim 1, wherein said assigning a weight to each of said plurality of configurations is estimated to be dependent upon the economic value added (EVA) by each of the wafer processes capable of being performed by said cluster tool while in respective said plurality of configurations.

5. The method of claim 1, wherein said assigning is performed in response to user input specifying each said weight.

6. The method of claim 1, wherein said plurality of cluster tool configurations comprises all possible operable and inoperable state combinations of said plurality of modules.

7. The method of claim 1, wherein said plurality of cluster tool configurations comprises a subset of all possible operable and inoperable state combinations of said plurality of modules.

8. The method of claim 1, wherein said operable state is defined as being in one of the non-scheduled time, unscheduled downtime, scheduled downtime, and engineering time E10 states.

9. The method of claim 1, wherein said inoperable state is defined as being in one of the standby time and productive time E10 states.

10. The method of claim 1, further comprising determining at least one key module of said plurality of modules, wherein said cluster tool is inoperable if at least one of said at least one key module is in an inoperable state.

11. The method of claim 10, further comprising logging each of said plurality of modules in the operable state except a first of said at least one key module in a standby due to other modules down sub-state of the E10 standby state when said first key module is in the inoperable state.

12. The method of claim 1, further comprising determining a main module of said plurality of modules, wherein said cluster tool is inoperable if said main module is in an inoperable state.

13. The method of claim 12, further comprising logging events against said main module used in determining the productive time of said main module.

14. The method of claim 13, wherein said calculating said performance comprises calculating the productive time of said cluster tool in a first of said plurality of cluster tool configurations as the product of the productive time of said main module and the respective weight in said matrix of configurations assigned to said first configuration.

15. The method of claim 13, wherein said calculating said performance comprises calculating the productive time of said cluster tool in a first and second of said plurality of cluster tool configurations as the sum of:
the product of the productive time of said main module in said first configuration and the respective weight in said matrix of configurations assigned to said first configuration; and
the product of the productive time of said main module in said second configuration and the respective weight in said matrix of configurations assigned to said second configuration.

16. The method of claim 12, further comprising logging events against said main module used in determining the uptime of said main module.

17. The method of claim 16, wherein said calculating said performance comprises calculating the uptime of said cluster tool in a first of said plurality of cluster tool configurations as the product of the uptime of said main module and the respective weight in said matrix of configurations assigned to said first configuration.

18. The method of claim 16, wherein said calculating said performance comprises calculating the uptime of said cluster tool in a first and second of said plurality of cluster tool configurations as the sum of:
the product of the uptime of said main module in said first configuration and the respective weight in said matrix of configurations assigned to said first configuration; and
the product of the uptime of said main module in said second configuration and the respective weight in said matrix of configurations assigned to said second configuration.

19. The method of claim 1, wherein said calculating said performance comprises calculating an availability percentage of said cluster tool based upon said matrix of configurations.

20. The method of claim 1, wherein said calculating said performance comprises calculating E10 metrics of said cluster tool based upon said matrix of configurations.

21. The method of claim 1, wherein said calculating performance of said cluster tool based upon said matrix of configurations comprises automatically calculating said performance of said cluster tool based upon said matrix of configurations using a computer.

22. The method of claim 1, further comprising reporting to a user said performance of said cluster tool calculated based upon said matrix of configurations.

23. The method of claim 22, wherein said reporting said performance of said cluster tool to a user comprises displaying said performance on a display device of a computer.

24. The method of claim 1, further comprising displaying a list of entities in a fabrication facility wherein the cluster tool resides and receiving user input selecting said plurality of modules of the cluster tool from said list of entities.

25. The method of claim 1, wherein said configuring each of said plurality of modules comprises configuring a known set of said plurality of configurations.

26. The method of claim 25, wherein said assigning a weight to each of said plurality of configurations comprises automatically assigning a weight to each of said known set of said plurality of configurations.

27. The method of claim 25, wherein said known set of said plurality of configurations comprises configurations in which at least one key module of said plurality of modules is down, wherein said cluster tool is inoperable if at least one of said at least one key module is in an inoperable state.

28. The method of claim 25, wherein said known set of said plurality of configurations comprises a configuration in which all of said plurality of modules are up.

29. The method of claim 1, further comprising displaying results of said calculating on a display screen of a computer system upon which said calculating is performed.

30. A computer system for calculating performance of a cluster tool, comprising:
a memory for storing data specifying a plurality of wafer processing modules defining said cluster tool;
a processor for configuring each of said plurality of modules in either an operable or inoperable state to produce a plurality of cluster tool configurations;
an input device for receiving user input assigning a weight to each of the plurality of configurations estimated to be dependent upon the performance of said cluster tool while in respective said plurality of configurations; and
wherein said processor is operable to compile a matrix of configurations from each said weight assigned in accordance with the user input and to calculate performance of said cluster tool based upon the matrix of configurations.

31. The computer system of claim 30, further comprising a display device for displaying said calculated performance.

32. A system for calculating performance of a cluster tool, comprising:

a cluster tool comprising a plurality of wafer processing modules; and a computer system coupled to said cluster tool, comprising:

a memory for storing data specifying said plurality of wafer processing modules of said cluster tool;

a processor for configuring each of said plurality of modules in either an operable or inoperable state to produce a plurality of cluster tool configurations;

an input device for receiving user input assigning a weight to each of the plurality of configurations estimated to be dependent upon the performance of said cluster tool while in respective said plurality of configurations; and wherein said processor is operable to compile a matrix of configurations from each said weight assigned in accordance with the user input and to calculate performance of said cluster tool based upon the matrix of configurations.

* * * * *